May 23, 1944. B. T. CLARK 2,349,705
REINFORCED TAPERED LUG STRAP AND METHOD OF MAKING
Filed Oct. 29, 1943 2 Sheets-Sheet 1
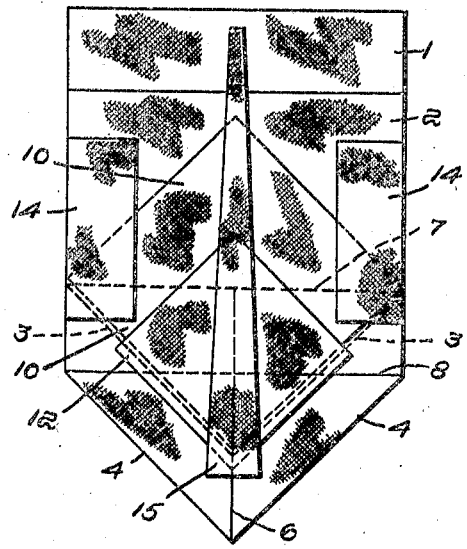
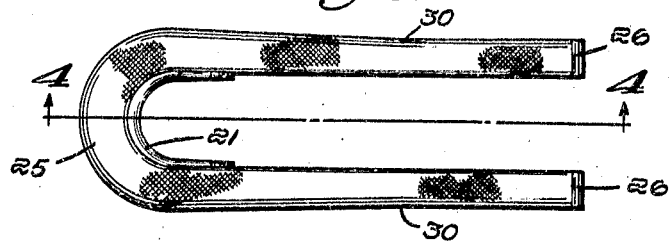
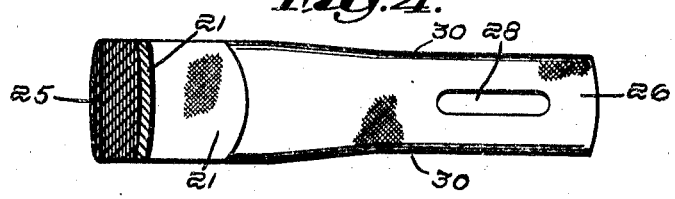
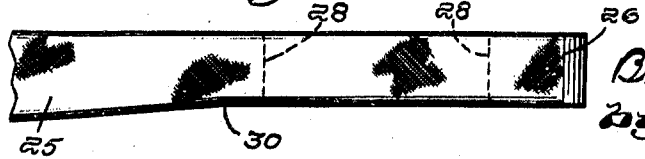
Inventor:
Breckinridge T. Clark
by James R. Hodder
Attorney May 23, 1944.     B. T. CLARK     2,349,705
REINFORCED TAPERED LUG STRAP AND METHOD OF MAKING
Filed Oct. 29, 1943     2 Sheets-Sheet 2
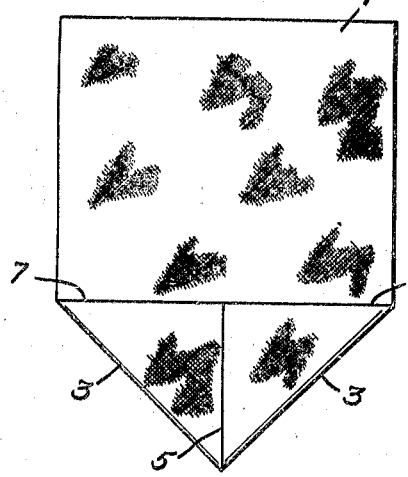
Fig. 5.
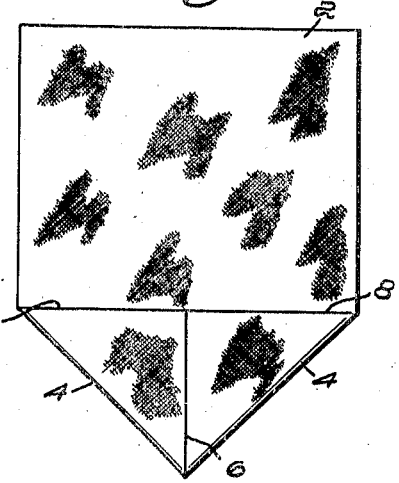
Fig. 6.
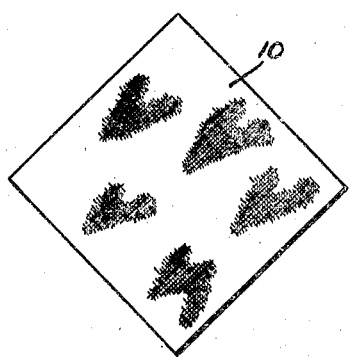
Fig. 7.
Fig. 8.
Fig. 9.
Fig. 10.
Fig. 11.
Inventor:
Breckinridge T. Clark
by James R. Hodder
Attorney Patented May 23, 1944

2,349,705

UNITED STATES PATENT OFFICE 2,349,705

REINFORCED TAPERED LUG STRAP AND METHOD OF MAKING

Breckinridge T. Clark, Danielson, Conn., assignor to E. H. Jacobs Mfg. Co., Inc., Danielson, Conn., a corporation of Connecticut Application October 29, 1943, Serial No. 508,183

4 Claims. (Cl. 139—153)

My present invention is a novel and improved lug strap of the type illustrated in prior U. S. Patents Nos. 1,775,077; 2,011,794 and 2,024,757.

The object of my invention is to improve and perfect the lug straps of the types therein disclosed, and includes a simple and efficient method of manufacturing the same.

In the making of canvas lug straps for use with present high speed loom machinery, it is important to have such lug straps reinforced at various points to withstand the strains and stresses incident to the uses to which they are put, and my present invention enables the reinforcements to be quickly and accurately assembled, as well as to insure that the reinforcing will be appropriately incorporated in a strong and tapered construction, producing a streamlined effect with a strong, wear-resisting crown construction.

Such canvas lug straps are necessarily coated with adhesive when being assembled, and the positioning of the adhesively coated sections constituting the reinforcing, and subsequently tapered construction, is most important, the entire mass of pieces positioned in their respective places and coated on each side with adhesive being applied in position while flat, and thereupon interrolled into a plastic mass, which is thereafter compressed, molded and allowed to "set" or harden into final, finished, reinforced and tapered construction.

An important feature of my present invention consists in my discovery that by folding over the edge, or edge portions, of the canvas layers which are incorporated into the lug strap, I obtain simultaneously greater increased strength, reinforcing, and tapering of the subsequent lug strap construction. This is most important at the crown of the U-shaped lug strap where the greatest wear occurs from the hammering action between the lug strap and picker stick.

By folding over these end portions in one or more of the canvas layers, I also insure the correct positioning of these reinforcing parts, as they are integral with the sheet or layer constituting the cover or filler, or both, in a completed lug strap and prevent any chance of displacement of the reinforcing and tapering portion.

Referring to the drawings illustrating preferred embodiments of my present invention:

Fig. 1 is a plan view of a completed lug strap when assembled, with all of the parts flat;

Fig. 2 shows the same on an enlarged scale after having been interrolled and compressed;

Fig. 3 illustrates a lug strap after it has been molded into final U-shaped form;

Fig. 4 is a cross-sectional view on the line 4—4 of Fig. 3;

Figs. 5, 6, 7, 8, 9, 10 and 11 are plan views of the layers and sections from which the lug strap is assembled.

Fig. 12 is a fragmentary enlarged view showing the taper from the crown to adjacent the bolt slot portions.

Referring to the drawings, as shown in Figs. 5 and 6, the principal cover and filling pieces are illustrated. These are layers of canvas of suitable width to equal the subsequent length of the lug strap and may be duplicates in size. The layer 1 I have designated as the outer layer or cover, and at one end I fold over the corner portions on a line approximately as shown at 3—3, having these corners united on a line 5 at the center, and forming a doubled section or reinforcing of this portion of the layer 1 from the line 7—7 to a point on which the folded corners meet. The main filler layer 2 has its corners similarly folded on lines 4—4 united on a center line 6 and edge portion 8, as shown. These two layers are assembled by coating the top surface of the cover 1 with adhesive, and preferably also the under surface of the folded corners. Thereupon, the similarly coated layer or filler 2 is superimposed on the cover 1, preferably in staggered position, substantially as shown in Fig. 1 with the folded corners at the same end but slightly staggered, as indicated.

I also prefer to add further reinforcing layers such as the layer 10 similarly coated with adhesive and positioned triangularly with regard to the cover 1 and filler 2; and a second reinforcing or crown member 12 similarly coated with adhesive is applied overlapping the center reinforcing member 10 and the folded corner portions of the layers 1 and 2. The crown member 12 is also diagonally or triangularly positioned with regard to the layers 1 and 2, and substantially as shown in Fig. 1.

I may then apply a still further center tapering and crown member 15 lengthwise of the assembled parts thus described, which gives added strength and holds the assembled layers in proper position during the interrolling.

Additional reinforcements 14 applied at each side to enable added strength to be accorded at the bolt slots in the completed lug strap are fitted. Thereupon the entire assembly is closely interrolled into a complete mass, preferably starting from the cover 1, thereby forming a relatively long tapered blank 20 which may be compressed for proper width and area. A bearing strip 21 of leather or other wear-resisting material is applied, which strip is also preferably tapered as shown, and thereupon the final molding action before the adhesive has set forms the reinforced and tapered lug strap into the final form shown in Figs. 3 and 4, with the crown 25 of greatly increased thickness and strength and the tapering to the bolt slot arms 26 thru which the bolt slots 28 are cut either when made or by the loom operator when affixing the same.

While the construction just described insures the extra thickness and reinforcing of the crown portion and simultaneous tapering toward the bolt slots, an important feature of the present invention consists in having the tapering part of each arm of the U-shaped lug strap stop short of the bolt slots so that the part where the bolt slots are cut will be substantially squared or rectangular to facilitate the fitting of the washers thru which the bolts are threaded.

For this purpose, the rectangular reinforcing sections 14—14 at each side will tend to "square up" the ends of the U-shaped arms and the compressing of the interrolled mass, as shown at 2, will preferably be formed so as to preserve the taper from the crown portion to approximately a point illustrated at 30—30 in Fig. 2, which will permit the end portions of each arm 26 to be substantially squared and untapered to permit the usual flanged washer (not shown) to fit over the end portions above and below the slots to take up the strain of the bolts which are fitted therethru and thru the slots. This is an important feature and is illustrated still further in Fig. 12 on an enlarged view, the slotted openings being shown in dotted lines at 28—28 and the straight, rectangular and untapered end portions of each arm 26. Thus the reinforcement at the crown and the main part of the U-shaped arms can be made of any thickness and increased strength and width desired; while the bolt slot ends could be a standard and squared or rectangular dimension to fit the standard type of flanged washers ordinarily employed. Thus, in a typical commercial type of lug strap embodying the present invention, the crown portion is made ¾" in thickness and 2½" in width; whereas the slot portions of each arm are substantially ½" in thickness and 2" in width. The width at the bolt portions thus would fit the ordinary 2" washer which may be square or round, with the flange ends overlapping the top and bottom of each arm at each slot, the strength of the two bolt slots even in reduced size being reinforced by the construction employed and being amply sufficient to withstand the wear and strain on the crown portion.

It will be appreciated that my present invention gives great strength because of the folded corner construction, insuring the accurate positioning of the reinforcing folded parts, as well as holding the extra reinforcing layers 10 and 12 in position by adding the center strip 15, which tends to hold the various layers accurately in alignment during the interrolling, as well as adding to the strength, thickness, and tapering from the crown 25 to the bolt slot ends 26.

Furthermore, the crossing of the woven threads in the triangularly positioned corner folds, diamond-laid reinforcing squares, and the interlacing and overlapping adds still further to the wear-resistance and long life of my present improved reinforced and uniformly tapered lug strap construction.

The feature of reinforcing, and particularly the reinforcing and tapering secured by the folding over of one or more of the layers while flat, and then interrolling, produces an exceptionally strong reinforcing construction, the folding of a corner or portion giving the added strength of the folded edge and the crossing of the woven material, and I believe this is a distinct novelty in this art and I wish to claim the same broadly.

I claim:

1. The improved process of making a reinforced tapered lug strap from interrolled textile material united with adhesive, which consists in preparing a sheet of textile of a width equal to the length of the lug strap to be made therefrom, folding over adjacent corners at one end of the sheet material, forming a point at the outermost end and constituting an integral double-layered mass adjacent said pointed end, adding reinforcing layers overlapping said folded portion, interrolling the assembled layers into an interrolled mass and molding while plastic into final U-shaped form, whereby a crown portion of greater thickness with a uniform tapering toward the bolt slots is produced.

2. The improved process of making a reinforced tapered lug strap from interrolled textile material united with adhesive, which consists in preparing a sheet of textile of a width equal to the length of the lug strap to be made therefrom, folding over one or more adjacent corners at one end of the sheet material, adding reinforcing layers overlapping said folded portion, adding a reinforcing strip at the center of the layers substantially throughout the length of the assembled material overlapping said folded portion, interrolling the assembled layers into an interrolled mass and molding while plastic into final U-shaped form, whereby a crown portion of greater thickness with a uniform tapering toward the bolt slots is produced.

3. A reinforced tapered lug strap of the kind described, comprising a sheet of flexible textile material coated with adhesive, having one or more folded corners to constitute an integral reinforcing and tapering crown construction, in combination with separate reinforcing layers secured by adhesive and overlapping the folded crown portion.

4. A reinforced tapered lug strap of the kind described, comprising a plurality of sheets of overlapping flexible textile material, united by adhesive, one of said sheets comprising a folded corner portion, constituting a reinforced tapered construction from the crown part of the completed lug strap outwardly toward the end, said folded edge portion constituting a reinforcing element in addition to the overlapping textile layers.

BRECKINRIDGE T. CLARK.